United States Patent Office 3,399,071
Patented Aug. 27, 1968

3,399,071
LAMINATES OF A POLYOLEFIN, A MALEIC ACID ANHYDRIDE MODIFIED OLEFIN POLYMER WAX AND PRINTING INK
Roy H. Schaufelberger, Basking Ridge, and Clayton S. Myers, Fanwood, N.J., assignors to Union Carbide Corporation, a corporation of New York
No Drawing. Continuation of application Ser. No. 453,503, May 6, 1965. This application July 11, 1967, Ser. No. 656,307
2 Claims. (Cl. 117—12)

ABSTRACT OF THE DISCLOSURE

A laminate of a polyolefin and a printing ink free of the polymer wax subsequently described adhered to the surface thereof by an adhesion promoter consisting of a modified olefin polymer wax having a molecular weight of from about 1,000 to about 5,000 reacted with maleic acid anhydride.

---

This application is a continuation of copending application Ser. No. 453,503, filed May 6, 1965, now abandoned, which is a continuation-in-part of application Ser. No. 203,441, filed June 19, 1962, now abandoned.

This invention relates to decorative coatings on polyolefin surfaces. More particularly, the invention relates to achieving adherent decorative coatings comprising paint or ink coatings on polyolefin surfaces, especially polyolefin film surfaces. The invention relates to method for achieving such coatings and compositions useful in such method.

The rapid growth of polyolefins as packaging materials e.g., as packaging film, packaging material coatings and molded containers such as bottles, especially blow molded bottles, has stimulated much research into means for printing thereon pictorial and written descriptions of package contents and directions for use and brand identification. Coatings serving an informative and/or attractive function are herein termed "decorative coatings" and the term thus includes surface coloration whether or not coextensive with the coated surface, and lettered coatings, as well as coatings constituting pictures or symbols.

Attempts to achieve satisfactory decorative coatings have heretofore been stymied by the total inertness of polyolefin surfaces which has precluded adhesion of known printing materials. Efforts to overcome this problem have up to now been largely centered on removing the inherent inertness of the polyolefin surface. Thus, techniques such as corona discharge, irradiation, chromic acid treatment and others have been employed to make decorative coating of polyolefin film feasible.

The difficulty with these techniques is that they modify the single most important property of the polyolefin, and the reason why it is a good packaging material in the first place, namely its inert character.

It is an object of the present invention to provide satisfactory decorative coatings on polyolefin surfaces. It is another object to provide method for satisfactorily decoratively coating polyolefin surfaces. It is another object to provide polyolefin surface receptive to decorative coating. It is another object to provide decorative coating adapted to adhere well to polyolefin surfaces. It is another object to provide decoratively coated polyolefin surfaces which are readily made adherent to a wide variety of polymeric, cellulosic, metallic and other substrates. It is still another object to provide laminates comprising a decoratively coated polyolefin surface and a substrate. Other objects will appear hereinafter.

It has now been discovered in accordance with the present invention that decorative coating of polyolefin surfaces is achieved by bringing to the interface of the polyolefin surface and the decorative coating a carboxylic reagent modified olefin polymer wax.

In particular it has been found that polyolefin surfaces can be decoratively coated, e.g., colored, uniformly or variegatedly, or printed with pictorial or literal information by placing between the polyolefin surface and the decorative coating a layer of a carboxylic reagent modified olefin polymer wax. This interposition can be accomplished by pre-coating the polyolefin surface prior to application of the decorative coating with the modified wax, or alternatively, the modified olefin polymer wax can be incorporated in the polyolefin prior to final fabrication and in an amount sufficient to ensure enough modified wax at the ultimate surface of the polyolefin to provide adhesion to the decorative coating, or, as a third alternative, the modified wax can be added to the decorative coating which will then comprise the modified wax, and conventional vehicles and colorants. In the last alternative, the decoratively coated portions of the polyolefin surface are potentially adherent to other substrates, notably other polyolefins and polymers, foils of aluminum and the like and cellulosic substrates, such as cardboard, cellophane and paper.

The decorative coating method and composition of the present invention are advantageously employed in decoratively coating all normally solid polyolefins, e.g., those polyolefins having molecular weights of about 10,000 and above, whether crystalline or amorphous or partly each, and whether of high, low or intermediate density.

The term "polyolefin" is used in the present specification and claims to denote normally solid homopolymers of alpha mono-olefinically unsaturated hydrocarbons as well as normally solid copolymers thereof, with one or more other organic compounds capolymerizable therewith which contain polymer producing unsaturation, such as is present for example in carbon monoxide and formaldehyde and in compounds containing the ethylene linkage >C=C< e.g., styrene, vinyl stearate, butene, vinyl acetate, vinyl formate, methacrylate, monobutyl maleate, 2-ethyl hexyl acrylate, N-methyl-N-vinyl acetamide, methacrylic acid, ethyl acrylate, acrylic acid, isoprene, butadiene, acrylamide, vinyl triethoxysilane, bicycloheptene, bicycloheptadiene, divinyl phosphonate and the like. Many other copolymerizable monomers which can be used in addition to these illustrative compounds are well known to the art. Preferred polyolefins in this invention contain at least 10 percent by weight of a combined alpha mono-olefinically unsaturated hydrocarbon having from 2 to 4 carbon atoms inclusive, i.e., butene-1, propylene and especially ethylene.

The term "modified-olefin polymer wax" refers to low molecular weight waxes, e.g., molecular weight from about 1000 to about 5000 of polyolefins as that term is defined in the paragraph next above which have been reacted with a carboxylic reagent as defined below. The method of preparation of the carboxylic reagent modified olefin polymer waxes used in the present invention is in no wise critical. For example, these waxes can be prepared in general by reaction of a carboxylic reagent with a molecular weight ethylene polymer, polymerized directly to that weight, or a low molecular weight polymer obtained by the pyrolysis or thermal degradation of a high molecular weight polyethylene e.g., having a density of from 0.88 to 0.97 and higher. Preferably the polyethylene to be pyrolyzed is substantially linear and has a density of 0.94 to 0.97 as these pyrolysis products after modification provide the best adhesion. The pyrolysis is conveniently carried out in a heated pyrolysis tube at about 450°–600° C. but can be effected in any known manner.

In a preferred method of preparing the modified olefin polymer waxes, an olefin polymer wax e.g., an ethylene polymer wax having a density above about 0.94 and a molecular weight of from about 1500 to 5000 is blended in the liquid phase, i.e., in the melt or in solution with from 1 to 25 percent by weight of a carboxylic reagent, e.g., maleic anhydride, and reacted by being agitated therewith at temperatures of from about 130° C. to about 250° C. and preferably above 180° C. with lower density ethylene polymer waxes, reaction temperatures of 80° C. and above are suitable. What is required is that the reaction mixture be agitatable. The blending and agitation can be carried out in any manner which insures intimate comingling of the reactants and good heat transfer throughout the reaction mass during the reaction time. For example, the olefin polymer wax can be dissolved in an inert liquid organic solvent for the wax and carboxylic reagent such as toluene, xylene, cyclohexane, methylcyclohexane, isooctane and chlorinated hydrocarbon solvents such as orthodichlorobenzene, 1,1,2-trichloroethane and α-chloronaphthalene. The dissolving of a polyethylene wax is most conveniently accomplished at temperatures above 110° C. in aromatic solvents, for higher density polyethylenes.

It is preferred to effect reaction in the melt in the absence of an organic solvent by heating a high density polyethylene wax to its melting point (ca. 130° C.) and above, e.g., to 180° C. and stirring in from 5 to 15 percent, based on the wax, of carboxylic reagent, e.g., maleic anhydride and continuing heating for 60–90 minutes. Temperatures of reaction either in solution or in the melt above about 250° C. confer no added benefit in speed of reaction or quality of modified wax obtained and, hence, will not be ordinarily used. The modification reaction can be effected under pressure to prevent undue volatilization of carboxylic reagent. The viscosity of the melted polyethylene waxes, e.g., 250–1000 centipoises at 2000° C. is such that rapid stirring of the carboxylic reagent is easily accomplished. The exact manner or order of addition of the reactants is not critical. Any excess carboxylic reagent is removed after the reaction as by vacuum distillation or like technique.

The term "carboxylic reagent" as used herein refers to an organic compound containing at least one carboxyl group selected from the group consisting of (1) alpha-unsaturated monocarboxylic acids having from 3 to 6 carbon atoms, as for example, acrylic acid, crotonic acid, sorbic acid and the like, (2) alpha-unsaturated dicarboxylic acids having from 4 to 10 carbon atoms, as for example maleic acid, tetrahydrophthalic acid, fumaric acid, glutaconic acid, itaconic acid and the like, (3) mercapto carboxylic acids having from 2 to 10 carbon atoms. As for example, 2-mercapto acetic acid (commonly called thioglycolic acid), 3-mercapto propionic acid, 4-mercapto butyric and 2-mercapto succinic acid, 2-mercapto adipic acid, and the like, (4) anhydrides of the foregoing acids, for example maleic anhydride and the like, and (5) esters of the foregoing acids, for example the ethyl ester of thioglycolic acid and the like all of these carboxylic reagents are capable of undergoing an addition reaction to one or more olefinic linkages occurring in polyethylene waxes.

In one embodiment of the present invention adhesionability to decorative coatings is imparted to polyolefins by incorporating a carboxylic reagent modified olefin polymer wax into polyolefin resins. The incorporation is conveniently effected by blending the modified olefin polymer wax and the polyolefin together as by fluxing on a two-roll mill or in a Banbury mixer until the mixture is substantially homogeneous. Or the incorporating can be carried out in an extruder or any other mixing or compounding device known to the art for incorporating additives in thermoplastics. The amount of modified wax incorporated into the polyolefin will vary with the particular end use envisioned for the compounded resin, e.g., the relative end use abuse the coating must withstand. Generally from 0.05 to 25 parts, preferably from 0.1 to 10 parts by weight of the modified wax is sufficient to impart adhesionability to the polyolefin base resin. Particularly from 3 to 5 parts by weight of the modified wax per 100 parts by weight of the compounded polyolefin composition is desirable.

The modified wax containing decorative coating adherent polyolefin composition can contain as well colorants, modifiers, fillers, stabilizers, flame retardants and other conventional additives for thermoplastic resins in reasonable amounts. The polyolefin compositions containing the modified wax are formable by known techniques into films, sheeting, coatings and other surface providing contours all possessing adhesionability to decorative coatings. These compositions can, therefore, be employed as "veneer" coatings applied either as film or from the melt on less impervious but printable substrates without loss of printability; or used as the "sandwich" layer in laminate constructions comprising one clear substrate with a similar or dissimilar polymeric, metallic, cellulosic, fibrous or nonfibrous substrate; or these compositions can be used as "primer" coatings to enable the adhesion of decorative coatings to otherwise non-adherent substrates.

In another embodiment of the present invention adhesionability to decorative coatings is imparted to polyolefin surfaces by coating the surface to be decoratively coated with a layer of modified wax. The application of the wax to the surface can be readily accomplished by the use of a hot melt solution or emulsion of the wax, roller coating, dip coating, spray coating or otherwise contacting the substrate with the wax.

In another embodiment of the present invention adhesionability to polyolefin surfaces is imparted to decorative coatings, e.g., printing inks. In general, the printing ink compositions of the present invention are prepared by adding to conventional printing inks the carboxylic reagent modified olefin polymer waxes described herein.

Typical preparative techniques include fine grinding the modified wax e.g., in a micropulverizer, micronizer or pebble mill, and blending with the conventional ink ingredients e.g., one or more pigments or dyes and other modifiers in any convenient manner and at any time in the preparation of the inks. For example, the modified wax can be added to a pigment which is then let down to the desired viscosity by addition of some liquid, e.g., organic solvents such as aromatic hydrocarbons. Alternatively, the modified wax and pigment or dye can be preblended, e.g., by fluxing the modified wax on a two-roll mill, gradually adding and grinding in the pigment or dye and removing the blend obtained as a sheet or "pigment chip." Or a pre-blend can be made by incorporating the pigment or dye in a melt of the modified wax, as simply as by stirring to homogeneity, allowing the melt to cool and then handling as a pigment chip. If desired and advantageously with the modified waxes herein described, an aqueous emulsion of the wax can be prepared (as described below) and the emulsion blended with the pigment or dye. Preferably the pigment or dye is then added in some compatible liquid medium, e.g., water or alcohol. Also the pigment chips described above can themselves be emulsified and thus made into inks. In each of the foregoing techniques the conventional additives and modifiers for ink formulation can be present in the ink in the usual amounts. These additives and modifiers include among others fillers, modifying resins, driers, liquid carriers, flow control agents, and leveling agents.

The coloring compounds used in the modifier ink compositions of the present invention are the conventionally used dyes and pigments. Examples of these compounds are pigments such as cadmium yellow, cadmium red, cadmium maroon, black iron oxide, titanium dioxide, chrome green, gold, silver aluminum and copper; and dyes such as alizarine red, Prussian blue, auramin naphthol, malachite green and the like.

The choice of ink formulation is widely variable and will be determined by the viscosity characteristics required by the particular printing method in which the ink is to be used. For example, flexographic inks, which are used to print on film have low viscosities, e.g., 22–25 seconds measured by a No. 2 Zahn cup, but silk screen inks, typically used to print on bottles and other containers, have very high viscosities e.g., 25,000 centipoises on a Brookfield viscometer. Generally from 5 to 50 parts by weight, preferably from 15 to 35 parts by weight, based on solids, of the modified wax is incorporated in 100 parts by weight of the commercially available inks.

The decorative coatings taught herein when contacted with the polyolefin surface can be in either the fluid state, as in normal printing, or the solid state as when the ink is supported prior to contact by adhesion to a substrate, which is then laminated via the ink or otherwise to the polyolefin.

The criticalities of hot melt or solution application to polyolefin surfaces or incorporation into polylefin or an ink formulation can be avoided by use of an anionic, cationic or non-ionic emulsion of the modified wax as the coating mixture. Typically anionic water emulsions are prepared by melting together the carboxylic reagent modified polyethylene wax and a fatty acid such as, for example, formic, acetic, propionic, butyric, valeric, caproic, enanthylic, caprylic, perlagonic, capric, undecylic, lauric, tridecoic, myristic, pentadecanonic, palmitic, megaric, stearic, nondecylic, arachidic, behenic, carnaubic, hyenic, carborceric, cerotic, laccroic, mellissic, montanic, psyllic, acrylic, crotonic, isocrotonic, vinylacetic, methylacrylic, tiglic, angelic, senecioic, hexenic, tetracrylic, hypogeic, oleic, elaidic, erucic, brassidic, propiolic, propynoic, tetrolic, 2-butynoic pentinoic, 2-pentionoic, amylpropiolic, palmitotic, stearolic, behenolic, sorbic, linoleic and linolinic acids and the like.

These acids have the general formula

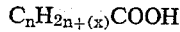

wherein $n$ is an integer from 0 to 32 and $x$ is an odd number from $-5$ to $+1$ with the proviso that when $n=0$, $x=+1$. An amine soap is then added such as mono- and triethanolamine, monoisopropanolamine, diisopropanolamine, morpholine, N,N-dimethylethanolamine and N,N-diethylethanolamine. The mixture is stirred until thoroughly mixed. Water which has been heated to about 130° C. under pressure is added. Pressure being maintained, the mixture is then vigorously agitated in a suitable device, e.g., a bladed mixer, colloid mill or other shear producing apparatus to form the emulsion. A carboxylic reagent modified polyethylene wax solids content of from 5 to 50 percent is preferred in emulsions to be used in the ink compositions of this invention.

The water emulsion of the maleic anhydride modified wax is readily mixed with both aqueous and alcoholic base pigment or dye inks and this mixture is easily coated onto or printed on a polyolefin substrate by any of the conventional techniques. The liquid of the emulsion is evaporated either by allowing the emulsion to stand at room temperature or preferably by force drying as by air movement around and/or application of heat to the emulsion. Upon drying there remains a non-tacky and non-blocking colored coating which is adherent to polyolefin surfaces and numerous other materials. It is critical at some stage of the application of all the decorative coatings of this invention to subject the coated surface to high temperatures e.g., 60° C. and higher for a brief period to secure maximum adhesion.

A particularly desirable use of the ink compositions of the present invention is in simultaneously rendering more attractive and more adherent the polyolefin films used in "skin packaging," i.e., the formation of contoured containers for odd-shaped objects by drawing a vacuum on deformable film e.g., through holes in the surface of a relatively flat and rigid substrate member to bring the film over and around the object to be packaged. The film clings on contact and thereby simultaneously anchors and protects the packaged object. This packaging technique is described in U.S.P. 2,885,735 to Groth, for example. It is, of course, essential to obtain great adhesion between the film and the relatively rigid substrate member. The present invention provides a means for securing this desired adhesion by printing on or coating the film or substrate with the inks of this invention to promote adhesion as well as decorate the substrate. Heretofore, conventional printing inks have required use of an adhesive layer between the ink and the film. The printing ink compositions of this invention obviate the extra step by being themselves adherent to both substrate and polyethylene film.

The following examples illustrate the practice of the present invention. All parts and percentages are by weight unless otherwise stated.

EXAMPLE 1

A maleic anhydride modified polyethylene wax was prepared by extruding a 0.96 density resin from a screw extruder through a hot tube 48 inches in length, having a diameter of 3 inches and fitted with an axially positioned 2⅞ inch diameter torpedo, at a rate of 32 pounds per hour. The torpedo was heated to 425° C.

Sixty pounds of the resulting wax was reacted with 6 pounds of maleic anhydride for 90 minutes at 220° C. in a 15 gallon autoclave equipped with a Dowtherm jacket and a 6 inch turbine agitator. The reaction product was recovered by stripping the excess maleic anhydride under 5 mm. Hg pressure and removing the reaction product. The modified wax contained over 3 percent carboxyl (calculated as succinic acid) and had a viscosity of about 500 centipoises at 140° C.

One hundred grams of the above prepared modified wax was mixed with 20 grams of morpholine, 20 grams of oleic acid and 300 grams of water. The mixture was charged to a pressure reaction vessel and heated to 150° C. with agitation for ½ hour and immediately cooled. There was obtained a translucent emulsion having a solids content of about 30 percent (31.9%).

One hundred grams of silk screened ink (International Printing Co. #361 silk screen ink) was added to 50 grams of the 30% solids modified polyethylene wax emulsion.

Mixing was by manual stirring. The ink thus prepared was applied to a high density polyethylene bottle exterior.

The bottle had been given no previous treatment to promote adhesion. Application was by wiping. Final ink coating thickness was typical of silk screen ink applications. The ink coated high density bottle was heated briefly by passing through a propane gas flame at 55 ft./min. Upon cooling and setting for 24 hours the ink coating samples were tested for ink adhesion first by laminating "Scotch" brand cellophane tape (trademark of Minnesota Mining and Mfg. Company) with hand pressure to the coated film surface and stripping it from the surface and second by drawing an abrasive scribe across the coated film surface.

The ink coating did not scratch. This shows the tremendous abrasion resistance of the printing ink compositions of this invention. The ink coating was not taken up by the Scotch tape upon its removal using a quick vertical pull showing the tenacious adhesion of the printing ink compositions of this invention. The above described ink coatings are easily buffed to a very high gloss.

EXAMPLE 2

Example 1 was duplicated but substituting a flexographic ink (Bensing Brothers & Deeney Ink Company, X-Pliopake R-4148 flexographic ink) for the silk screen ink and using 20 grams of the modified wax emulsion and 20 grams of the flexographic ink. Again excellent ink adhesion to the unmodified polyethylene surface was achieved as indicated by no lift off by Scotch tape and no scratch by the abrasive scribe.

EXAMPLE 3

Example 1 was duplicated but substituting a silk screen vacuum forming ink (International Printing Ink Company #600 Series vacuum forming ink—normally used for poly(vinyl chloride) substrates for the silk screen ink. Printing was by the silk screen process onto 21 mil high density polyethylene sheet. After only air drying, the sheet ink side out was vacuum formed over a deep draw (4.5 inches) male mold. The vacuum forming operation provided the heat necessary to adhere the ink composition. Lift off and scratch characteristics were excellent as in Examples 1 and 2.

EXAMPLE 4

Example 3 was duplicated but substituting polypropylene for the polyethylene. Results were excellent.

EXAMPLE 5

An aquous emulsion prepared substantially as in Example 1 but containing only 5 percent solids was coated onto a high density polyethylene bottle. The coated bottle was then printed on with a silk screen ink (International Printing Ink Company "Polyfast" silk screen ink). The printed bottle was oven dried at 170° C. for 15 minutes and then passed through a propane gas flame rapidly (50 ft./min.). Adhesion and scratch resistance were tested as above and were found to be excellent.

EXAMPLES 6–10

Maleic acid modified waxes of the polymer of Examples 1–5 were tested and found to provide adhesion and abrasion resistance equal to maleic anhydride modified wax.

The ink formations described herein can be used in the dual role of obtaining decorative effects and promoting adhesion of polyethylene film to normally nonadherent substrates.

EXAMPLES 11–13

In these examples corrugated paperboard (Example 11), clay coated paperboard (Example 12) and patent coated paperboard (Example 13) are printed on with each of the three inks of Examples 1–3. The so printed paperboards are then employed as the relatively rigid substrate in skin packaging. Ordinarily in skin packaging, an adhesive primer placed on the printed or decorated paperboard substrate and activated by the heat of the packaging film accomplishes the bonding. In these examples no adhesive primer is applied to the film or the paperboard substrate, in order to demonstrate that the minor proportion modified olefin polymer wax containing printing ink of the present invention promotes bonding. The articles to be packaged were plastic bottle caps. The packaging film is heated by radiant means for 5–8 seconds until it begins to soften. This film is vacuum drawn over the cap and paperboard substrate in the known manner. Vacuum is maintained for 5 seconds. After the assembly is cooled, adhesion is inspected by lifting the film from the substrate. Wherever the film contacted the printing ink of the invention, tenacious adhesion between the film and the paperboard substrate is developed as evidenced by deep paper failure when the film is lifted from the substrate.

In a control experiment the above procedure is duplicated but using the same commercial printing inks without addition of the minor amount of modified wax. The film parted easily from the paperboard substrates with no fiber failure occurring.

Similarly "blister packaging" the encapsulation of odd shaped objects between a preformed "bubble" of relatively rigid film and a relatively rigid substrate member can be improved by the use of polyolefin film or sheeting as the bubble and modified ethylene polymer wax containing printing ink at the interface of the film or sheeting and the substrate. Also, the film can be printed on and adhered to an untreated substrate.

EXAMPLES 14–17

Examples 11–13 are duplicated but substituting a printed film and an unprinted substrate. Results are identical.

EXAMPLE 18

A thioglycolic acid modified polyethylene wax was prepared by reacting 500 grams of a high density polyethylene wax, which had been prepared by pyrolysis of high density polyethylene at 475° C. and at a rate of 6 pounds per hour through a 1/32 inch annular clearance in a pyrolysis tube, with 36 grams of thioglycolic acid at 145° C.

An emulsion of the modified wax was prepared by melting together 20 grams of oleic acid, 100 grams of modified wax, and 20 grams of morpholine. The mixture was heated at 130° C. and 800 parts of water were added under pressure. The blend was then stirred vigorously under pressure at 150° C. to form the emulsion.

The emulsion is blended with a silk screen ink and coated onto low and high density polyethylene film in the manner of Example 1. Abrasion resistance and adhesion of the printing ink is excellent.

EXAMPLE 19

A solution of the maleic anhydride modified polyethylene wax of Example 1 in toluene is mixed with an organic base ink, and the mixture applied to polyethylene sheet. The ink is air dried. Adhesion is excellent.

Using the modified wax of Example 1, a mixture of 1, 5, 10 and 20 parts of the wax and respectively 99, 95, 90, and 80 parts of polyethylene are prepared by fluxing the components in a Banbury. The mixtures are extruded as films by the trapped bubble process cooled, slit and wound. The films obtained are printed on with commercial printing inks. Adhesion and scratch resistance are excellent as indicated by no lift off by Scotch tape or scratching from an abrasive scribe.

EXAMPLE 20

A mixture of 50 grams of the modified wax emulsion of Example 1 and 100 grams of a flexographic ink (International Printing Ink Company Gemglo 67126 flexographic ink) was printed on unmodified low density polyethylene film. After air drying the decoratively coated film was used to line a quart mold cavity, printed side of the film facing in. A high density polyethylene bottle was then blown in the mold. There was obtained a printed polyethylene bottle having a protective film over the print.

We claim:

1. A laminate comprising a polyolefin substrate and a printing ink free of the polymer wax subsequently described adhered to a surface thereof by an adhesion promoter consisting of a modified olefin polymer wax having a molecular weight of from about 1000 to about 5000 reacted with a maleic acid anhydride.

2. A laminate comprising a polyolefin film, a printing ink free of the polymer wax subsequently described and a substrate, said printing ink being adhered to said polyolefin film by an adhesion promoter consisting of a modified ethylene polymer wax having a molecular weight of from about 1000 to about 5000 reacted with a maleic acid anhydride.

References Cited

UNITED STATES PATENTS

| | | | |
|---|---|---|---|
| 2,925,354 | 2/1960 | Berardinelli et al. | 117—12 |
| 2,938,016 | 5/1960 | Johnson | 252—8.5 X |
| 3,018,195 | 1/1962 | Kelly et al. | 117—138.8 |
| 3,216,885 | 11/1965 | Schaufelberger | 117—12 X |

OTHER REFERENCES

Larsen, "Industrial Printing Inks," Chapman & Hall, 1962, p. 1.

WILLIAM D. MARTIN, *Primary Examiner.*

M. LUSIGNAN, *Assistant Examiner.*